(No Model.)
A. W. ROBINSON.
CHAIN BUCKET.
No. 588,531. Patented Aug. 17, 1897.
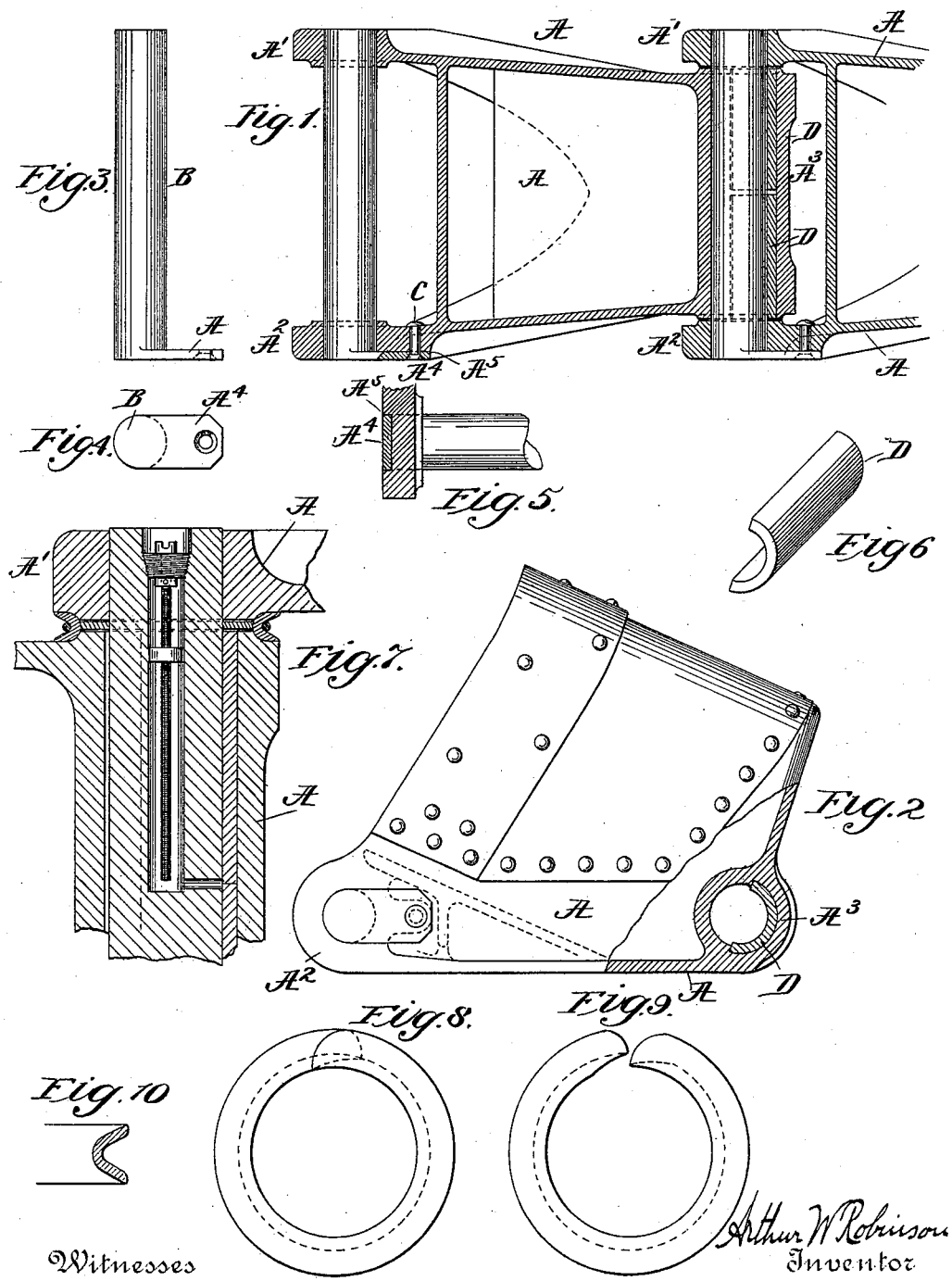
Witnesses
Ben D Bell
A Bodene Morrison
Arthur W Robinson
Inventor
By his Attorney Phillips Abbott

UNITED STATES PATENT OFFICE.

ARTHUR W. ROBINSON, OF MILWAUKEE, WISCONSIN.

CHAIN BUCKET.

SPECIFICATION forming part of Letters Patent No. 588,531, dated August 17, 1897.

Application filed February 16, 1897. Serial No. 623,726. (No model.)

*To all whom it may concern:*

Be it known that I, ARTHUR W. ROBINSON, a citizen of the Dominion of Canada, and a resident of Milwaukee, in the county of Milwaukee and State of Wisconsin, have invented certain new and useful Improvements in Chain Buckets, of which the following is a specification.

My invention relates to that class of dredging and like machinery in which endless chains of buckets hinged together are employed.

My objects are, first, to increase the durability of the joint-pin connections of such buckets, and, secondly, to provide means whereby they can be firmly secured in place and prevented from turning and from end motion.

In the drawings the same reference-letters indicate the same parts in all the figures.

Figure 1 illustrates a horizontal section through the joint-pins of a bucket and its joining-link. Fig. 2 illustrates a side elevation of such bucket, showing the rear joint in section. Fig. 3 illustrates a side view of one of the joint-pins. Fig. 4 illustrates an end view of one of the joint-pins. Fig. 5 illustrates a vertical section through the lug of the joint-pin when in place, showing the manner in which it fits into a recess in the bucket-frame. Fig. 6 illustrates a view of one of the bushings. Fig. 7 illustrates a horizontal section through a joint-pin bushing, showing its application when fitted with protecting-rings and lubricators. Fig. 8 illustrates a side view of one of the protecting-rings. Fig. 9 illustrates a similar ring to Fig. 8, showing the ends somewhat separated. Fig. 10 illustrates a section of the protecting-ring, showing its shape before it is compressed into the groove.

A is one of the links of the bucket-chain. It may be either in the form of a plain connecting-link or formed with a bucket upon it, as shown in Fig. 2. The buckets may be attached either by being made integrally with them or otherwise, as preferred. The form of the link A is unimportant as regards this invention, except that it is formed with two narrow eyes $A'$ and $A^2$ at the front end and one broad eye $A^3$ at the rear end. The pin B fits closely in the eyes $A'$ and $A^2$, and it is desirable that it be firmly secured therein and prevented both from turning and from end motion. For this purpose the end of the pin is formed with a lug $A^4$, which projects from one side of it, as shown. This lug fits closely into a corresponding recess $A^5$, formed in the side of the front eye $A^2$ of the bucket. The engagement of this lug in the recess prevents the pin from turning. The lug is screw-bolted to the bucket by the bolt C, which effectually holds it in place against end motion. From this construction it will be seen that no wear occurs between the pin and front eyes $A'$ and $A^2$ due to the motion of the bucket-links, as the pin is firmly secured therein, and that the pin does not project at any part beyond the lateral plane of the links. Thus they will not be injured by striking against rock or other obstructions, nor will they catch and bring up objectionable matter of a ropy or stringy nature, which is frequently a very objectionable feature in dredging apparatus.

D, Fig. 6, illustrates a bushing which is placed in the long eye $A^3$ at the rear end of the bucket and upon which the turning of the pin takes place. The bushing is made in the form of a half-circle and fits into a corresponding recess or chamber formed in the rear eye of the bucket, as shown in Fig. 2. The bushing fits somewhat loosely in this chamber, and being made to fit the recess it is thereby prevented from turning. The bushing in Fig. 1 is shown in two halves, one half being inserted from either end, but it may be made in one piece, if desired. I make no claim to this bushing, but since it forms a part of my perfected chain I illustrate it, that the invention as a whole may be more fully understood and appreciated.

It will be noted that because the lug on the pin projects from one side only, and that the side away from the strain, the durability of the parts is increased, because the recess thus formed does not subtract from the effective section of the metal forming the eye inclosing the pin. Thus all of it is left to resist wear and strains.

In Figs. 6, 7, and 8 I show the method of lubricator and protecting-rings which may be advantageously used in connection with my improved pins and bushings. These, however, are not essential to the invention, as the improved joint-pins may be used without them, and they therefore need not be specifically described. For a more perfect understanding of this feature, however, I will say that these protecting-rings and oilers have already been made the subject of a patent by me, No. 436,008, dated September 9, 1890.

I claim—

1. In a dredge-bucket chain, a joint-pin having a lug formed on one end thereof and extending laterally therefrom, a bucket bottom or frame having a recess which extends away from the direction of strain, adapted to receive the lug, so that it will be substantially flush with the side of the frame, and a screw passing through the lug and entering the bucket-frame whereby the pin is prevented from endwise movement, for the purposes set forth.

2. In a dredge-bucket chain, a bucket bottom or frame having a single eye at one end through which the joint-pin passes, a half-bushing located in a corresponding recess in the eye, a joint-pin provided with a lug at one end which extends laterally therefrom, a recess which extends away from the direction of strain, adapted to receive and protect the said lug, whereby the pin is prevented from turning, and a screw-bolt passing through the lug and entering the said frame, for the purposes set forth.

Signed at Milwaukee, in the county of Milwaukee and State of Wisconsin, this 2d day of February, A. D. 1897.

ARTHUR W. ROBINSON.

Witnesses:
 T. D. MOORE,
 ELLEN B. MOORE.